United States Patent
Li et al.

(10) Patent No.: US 12,213,469 B1
(45) Date of Patent: Feb. 4, 2025

(54) WATER LIFTING DEVICE FOR PET WATER DISPENSER AND PET WATER DISPENSER

(71) Applicant: Shenzhen Shouzheng Chuqi Technology Co., Ltd., Shenzhen (CN)

(72) Inventors: Tong Li, Shenzhen (CN); Zhihai Tang, Shenzhen (CN); Yuliang Zhang, Shenzhen (CN)

(73) Assignee: Shenzhen Shouzheng Chuqi Technology Co., Ltd., Shenzhen (CN)

( * ) Notice: Subject to any disclaimer, the term of this patent is extended or adjusted under 35 U.S.C. 154(b) by 0 days.

(21) Appl. No.: 18/777,304

(22) Filed: Jul. 18, 2024

(30) Foreign Application Priority Data

Jul. 8, 2024 (CN) .......................... 202410910516.3

(51) Int. Cl.
*A01K 7/02* (2006.01)
(52) U.S. Cl.
CPC .................................... *A01K 7/025* (2013.01)
(58) Field of Classification Search
CPC ...... A01K 5/0225–0241; A01K 5/0258; A01K 7/025
See application file for complete search history.

(56) References Cited

U.S. PATENT DOCUMENTS

| | | | | |
|---|---|---|---|---|
| 4,143,999 A * | 3/1979 | Ryall | ......................... | F04D 1/14 416/177 |
| 11,317,604 B1 * | 5/2022 | Pang | ...................... | A01K 7/022 |
| 2007/0227461 A1 * | 10/2007 | Chern | ................... | A01K 5/0291 119/482 |
| 2010/0104415 A1 * | 4/2010 | Morando | ................... | F04D 1/14 415/206 |
| 2011/0067638 A1 * | 3/2011 | Lipscomb | ................ | A01K 7/02 137/560 |
| 2012/0163959 A1 * | 6/2012 | Morando | ................... | F04D 1/14 415/206 |

(Continued)

FOREIGN PATENT DOCUMENTS

| CN | 108770716 B | 12/2020 |
|---|---|---|
| CN | 108353810 B | 12/2021 |

(Continued)

OTHER PUBLICATIONS

Merged translation of CN_216821236 (Year: 2022).*

*Primary Examiner* — Morgan T Jordan
(74) *Attorney, Agent, or Firm* — JEEN IP LAW, LLC

(57) ABSTRACT

The present invention relates to the technical field of pet appliances, and in particular, to a water lifting device for a pet water dispenser and a pet water dispenser. The device includes a housing, a stirring assembly, and a driving assembly. The housing is provided with a lifting inner cavity with a lower side being a water inlet portion and an upper side being a water outlet portion, and the housing is further provided with a water inlet and a water outlet. The stirring assembly is arranged in the lifting inner cavity and guides a liquid in the water inlet portion to flow to the water outlet portion, and the driving assembly drives the stirring assembly to rotate in the lifting inner cavity. The device integrates and modularizes components and driving members used as water pumping power, to facilitate disassembly and cleaning.

18 Claims, 15 Drawing Sheets

(56) References Cited

U.S. PATENT DOCUMENTS

| | | | |
|---|---|---|---|
| 2015/0189856 A1* | 7/2015 | Alexander | A01K 39/02 119/74 |
| 2018/0295808 A1* | 10/2018 | Nero | A01K 7/02 |
| 2019/0075755 A1* | 3/2019 | Imaizumi | A01K 39/02 |
| 2019/0239475 A1* | 8/2019 | He | E03C 1/04 |
| 2020/0068848 A1* | 3/2020 | Sayers | F04D 13/06 |
| 2020/0337266 A1* | 10/2020 | Yu | C02F 1/002 |
| 2021/0144964 A1* | 5/2021 | Wang | B01D 39/1623 |
| 2021/0282369 A1* | 9/2021 | Tao | A01K 7/025 |
| 2022/0125010 A1* | 4/2022 | Sarinova | E03C 1/01 |
| 2022/0192149 A1* | 6/2022 | Tao | C02F 1/001 |
| 2022/0386563 A1* | 12/2022 | Wang | A01K 7/02 |
| 2023/0157259 A1* | 5/2023 | Xue | A01K 7/025 119/74 |
| 2024/0123380 A1* | 4/2024 | Noh | A01K 7/025 |
| 2024/0147959 A1* | 5/2024 | He | A01K 39/02 |

FOREIGN PATENT DOCUMENTS

| | | | |
|---|---|---|---|
| CN | 216821236 U | * | 6/2022 |
| CN | 113056189 B | | 2/2024 |

* cited by examiner

WATER LIFTING DEVICE FOR PET WATER DISPENSER AND PET WATER DISPENSER

CROSS-REFERENCE TO RELATED APPLICATIONS

The present application claims priority to Chinese Patent Application No. 2024109105163, filed Jul. 8, 2024, the entire disclosure of which is incorporated herein by reference.

TECHNICAL FIELD

The present invention relates to the technical field of pet appliances, and in particular, to a water lifting device for a pet water dispenser and a pet water dispenser.

BACKGROUND ART

A pet water dispenser is a drinking device for pets such as cats and small dogs, and the device can circulate and purify water when pets draw close or at all times. The pet water dispenser generally includes a water storage tank, a drinking cavity, a water pump, a filter assembly, and the like. When pets need to drink water, water in the water storage tank is pumped by the water pump into the drinking cavity for the pets to drink. In existing technical solutions, a submersible pump is mostly used as a power source. In such solutions, the submersible pump is placed below a liquid level of the water storage tank. This structure has the risk of electric leakage when running for a long time, and the submersible pump and other components will be slippery and affected by dirt in the water after being in the water for a long time, so that they are not easy to disassemble and wash, and affect water quality and use experience.

SUMMARY OF THE INVENTION

An objective of the present invention is to provide a water lifting device for a pet water dispenser, to integrate and modularize components and driving members used as water pumping power, so as to facilitate disassembly and cleaning and achieve an effect of facilitating cleaning.

Based on this, the present invention provides a water lifting device for a pet water dispenser, including a housing, a stirring assembly mounted on the housing, and a driving assembly connected to the stirring assembly. The housing is provided with a lifting inner cavity with a lower side being a water inlet portion and an upper side being a water outlet portion, and the housing is further provided with a water inlet in communication with the water inlet portion and a water outlet in communication with the water outlet portion. The stirring assembly is arranged in the lifting inner cavity and is configured to guide a liquid in the water inlet portion to flow to the water outlet portion, and the driving assembly is configured to drive the stirring assembly to rotate in the lifting inner cavity.

The embodiments of the present invention have the following beneficial effects.

The present invention provides a water lifting device for a pet water dispenser, which integrates components used as water pumping power, namely the stirring assembly and the driving assembly, to the independent housing, and only needs to be mounted on a pet water dispenser to be used. The driving assembly drives the stirring assembly to rotate, to stir the water in the lifting inner cavity and provide a vorticity to make the water in the lifting inner cavity rotate, with a liquid level profile being in the shape of an inverted bell (parabola with an upward opening). High liquid levels on two sides will rise along an inner wall of the lifting inner cavity, and the water overflows to the water outlet portion when the liquid level is higher than the inner wall, and finally flows out from the water outlet. In addition, in this solution, the driving assembly is separated from the water, and the driving assembly and the stirring assembly are easier to disassemble relative to the housing, so as to facilitate cleaning or maintenance after long-term use, maintain hygiene and safety, and prevent water pollution and an impact on use experience.

BRIEF DESCRIPTION OF THE DRAWINGS

To describe the technical solutions in the embodiments of the present application more clearly, the following briefly describes the accompanying drawings required for describing the embodiments. Apparently, the accompanying drawings in the following description show merely some embodiments of the present application, and those of ordinary skill in the art may still derive other accompanying drawings from these accompanying drawings without creative efforts.

DETAILED DESCRIPTION OF EMBODIMENTS

The technical solutions of the embodiments of the present invention are clearly and completely described below with reference to the accompanying drawings in the embodiments of the present invention. Apparently, the described embodiments are merely some rather than all of the embodiments of the present invention. All other embodiments obtained by those of ordinary skill in the art based on the embodiments of the present invention without creative efforts shall fall within the protection scope of the present invention.

Figure 1:
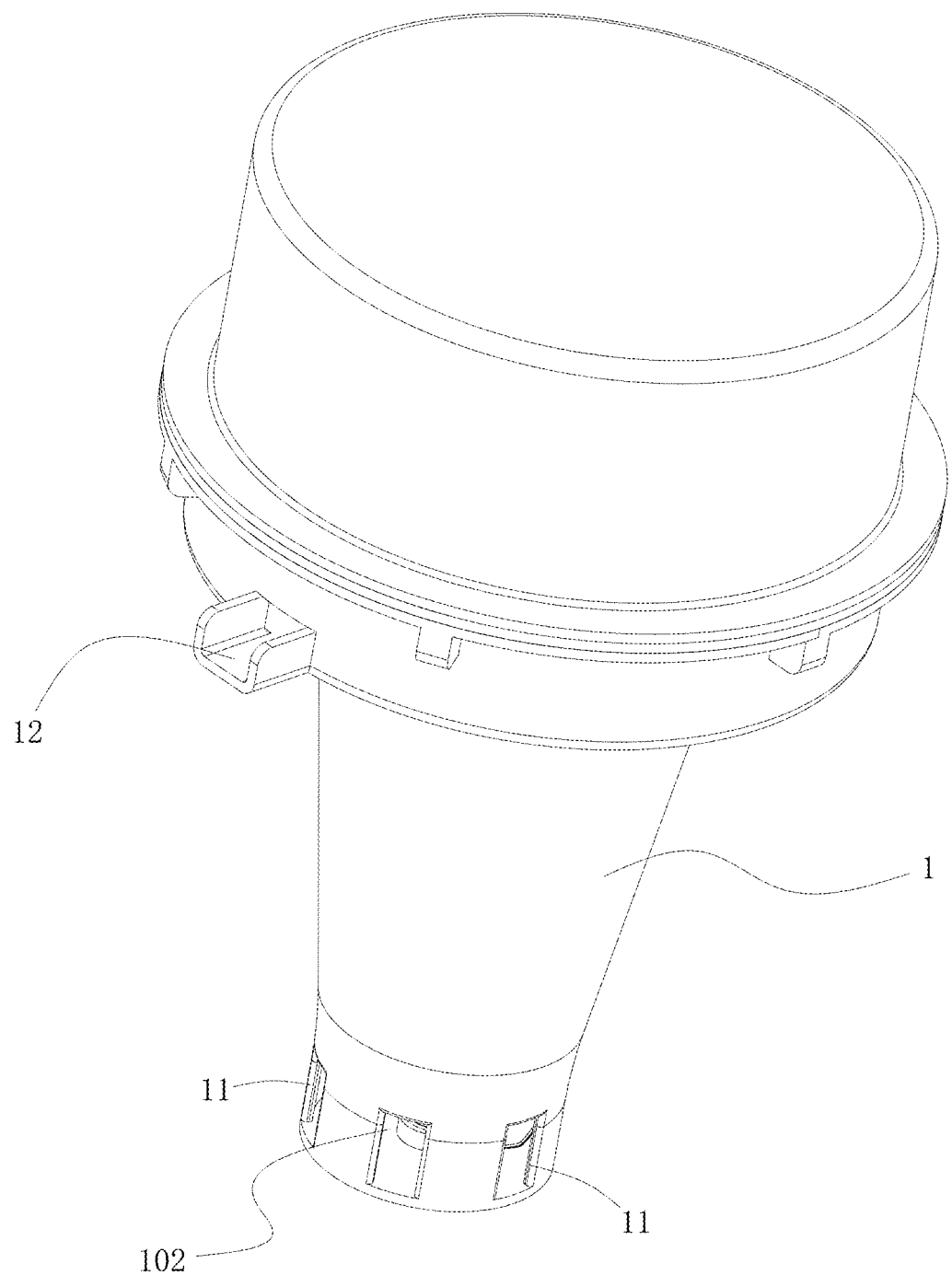
FIG. 1 is a schematic diagram of a water lifting device for a pet water dispenser according to an embodiment of the present invention.
Figure 2:
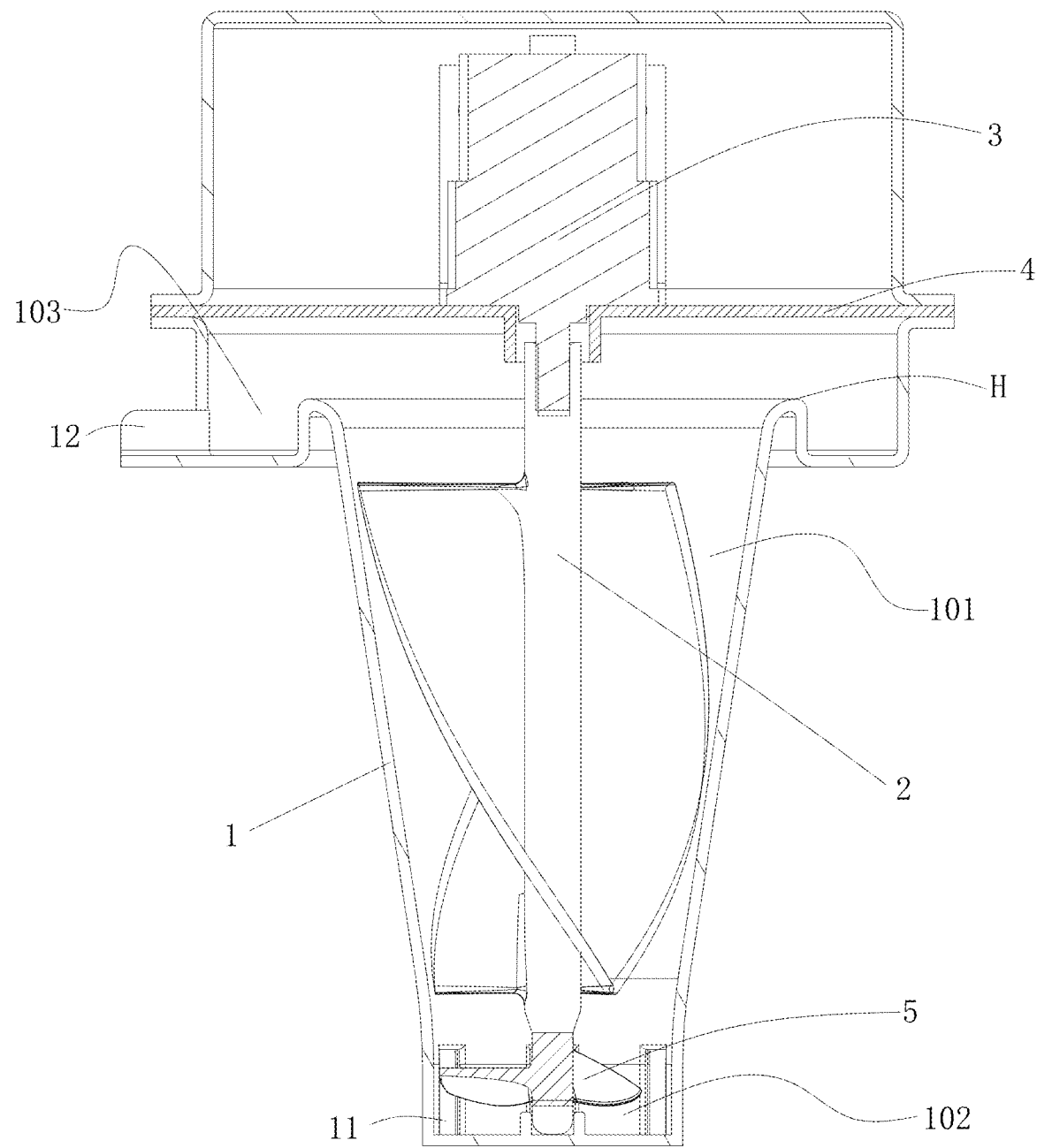
FIG. 2 is a half sectional view of FIG. 1.
Figure 3:
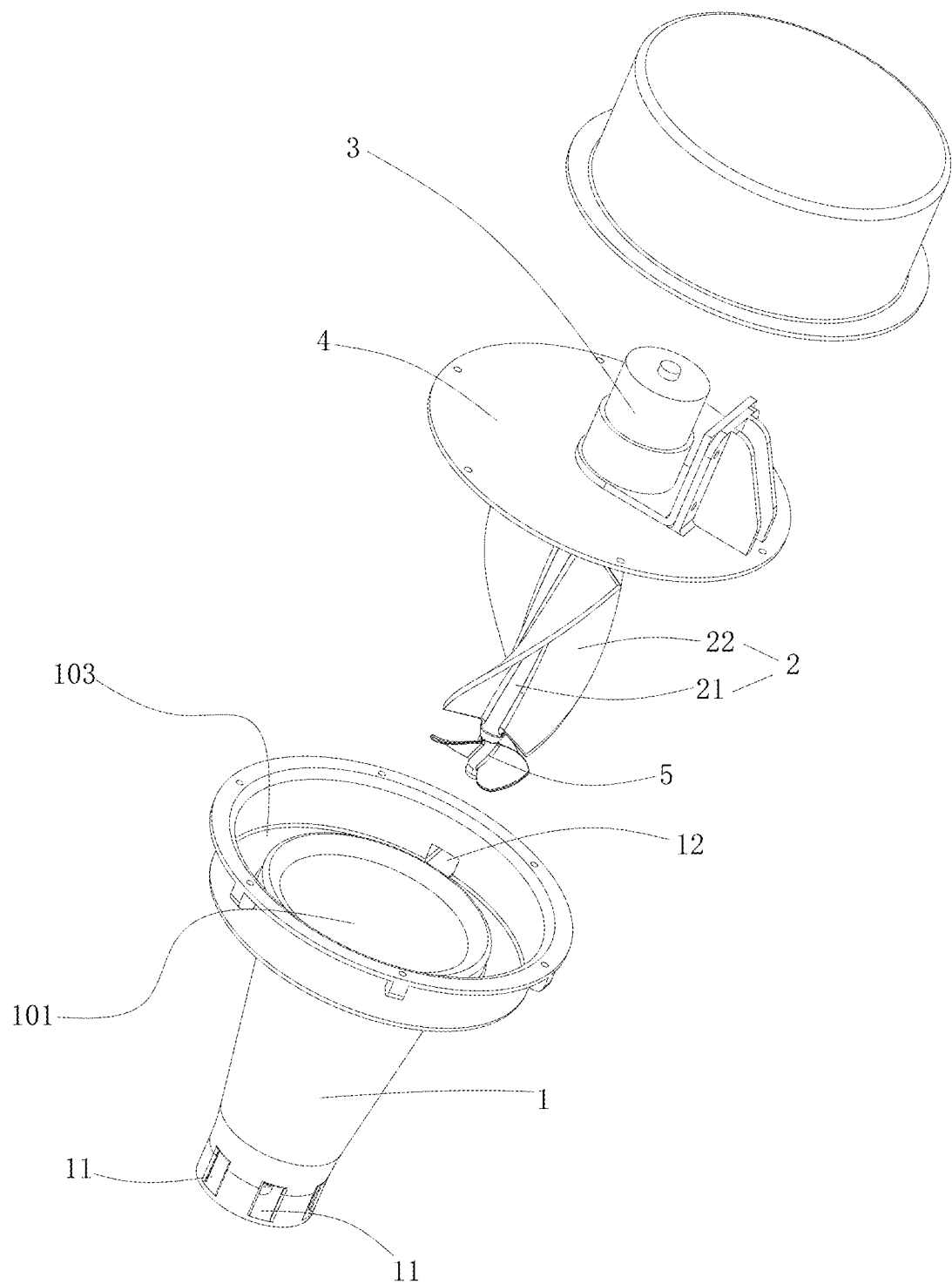
FIG. 3 is an exploded view of FIG. 1.

As shown in FIGS. 1 to 3, a water lifting device for a pet water dispenser includes a housing 1, a stirring assembly 2 mounted on the housing 1, and a driving assembly 3 connected to the stirring assembly 2. The housing 1 is provided with a lifting inner cavity 101 with a lower side being a water inlet portion 102 and an upper side being a water outlet portion 103, and the housing 1 is further provided with a water inlet 11 in communication with the water inlet portion 102 and a water outlet 12 in communication with the water outlet portion 103. The stirring assembly 2 is arranged in the lifting inner cavity 101 and is configured to guide a liquid in the water inlet portion 102 to flow to the water outlet portion 103, and the driving assembly 3 is configured to drive the stirring assembly 2 to rotate in the lifting inner cavity 101. The water lifting device for a pet water dispenser integrates components used as water pumping power, namely the stirring assembly 2 and the driving assembly 3, to the independent housing 1, and only needs to be mounted on a pet water dispenser to be used. The driving assembly 3 drives the stirring assembly 2 to rotate, to stir the water in the lifting inner cavity 101 and provide a vorticity to make the water in the lifting inner cavity 101 rotate, with a liquid level profile being in the shape of an inverted bell (parabola with an upward opening). High liquid levels on two sides will rise along an inner wall of the lifting inner cavity 101, and the water overflows to the water outlet portion 103 when the liquid level is higher than the inner wall, and finally flows out from the water outlet 12. In addition, in this solution, the driving assembly 3 and the stirring assembly 2 are easier to disassemble relative to the housing 1, so as to facilitate cleaning or maintenance after long-term use, maintain hygiene, and prevent water pollution and an impact on use experience.

Specifically, in this solution, the stirring assembly 2 is in contact with water when operating, while the driving assembly 3 needs to be separated from water. Therefore, in this solution, a partition plate 4 for sealing an upper end of the lifting inner cavity 101 is arranged on an upper side of the water outlet portion 103, and the driving assembly 3 is arranged on an outer side of the lifting inner cavity 101, thereby achieving an effect of water and electricity separation. The driving assembly may be directly connected to a periphery of the housing 1, or may be connected into the housing 1 and separated from the lifting inner cavity 101 by means of the partition plate 4. Correspondingly, when different mounting positions are adopted for the driving assembly 3, a method for connecting the driving assembly to the stirring assembly 2 may be correspondingly set as direct butt joint or butt joint by means of an intermediate transmission member, for example, butt joint by means of an intermediate transmission member such as a transmission gear, a transmission belt, a transmission chain or a turbo-worm, which can adapt to different directions of an output shaft and the stirring assembly 2 after the driving assembly 3 is mounted to implement transmission butt joint, and also facilitate use as speed regulating transmission butt joint.

In this solution, preferably, the driving assembly 3 is mounted on the partition plate 4. In this embodiment, it can be understood that the partition plate 4 seals upper ends of the lifting inner cavity 101 and the water outlet portion 103, so that the driving assembly 3 is isolated from the outside to avoid contact with water during operation. Usually, the driving assembly 3 is a motor, with a driving end penetrating the partition plate 4 to extend into the lifting inner cavity 101 to be mounted with the stirring assembly 2. Of course, in order to improve the separation effect, a sealing ring with the partition plate 4 can be added to the driving end of the driving assembly 3 to achieve a better water-proof effect.

In the present invention, the water outlet portion 103 is a temporary water storage tank located on a peripheral side of the lifting inner cavity 101, and a tank bottom of the temporary water storage tank is lower than the highest position H of an inner wall of the lifting inner cavity 101. The temporary water storage tank facilitates collection of water led out from the lifting inner cavity 101 in multiple directions, and draining to the water outlet 12 for outflowing.

Figure 4:
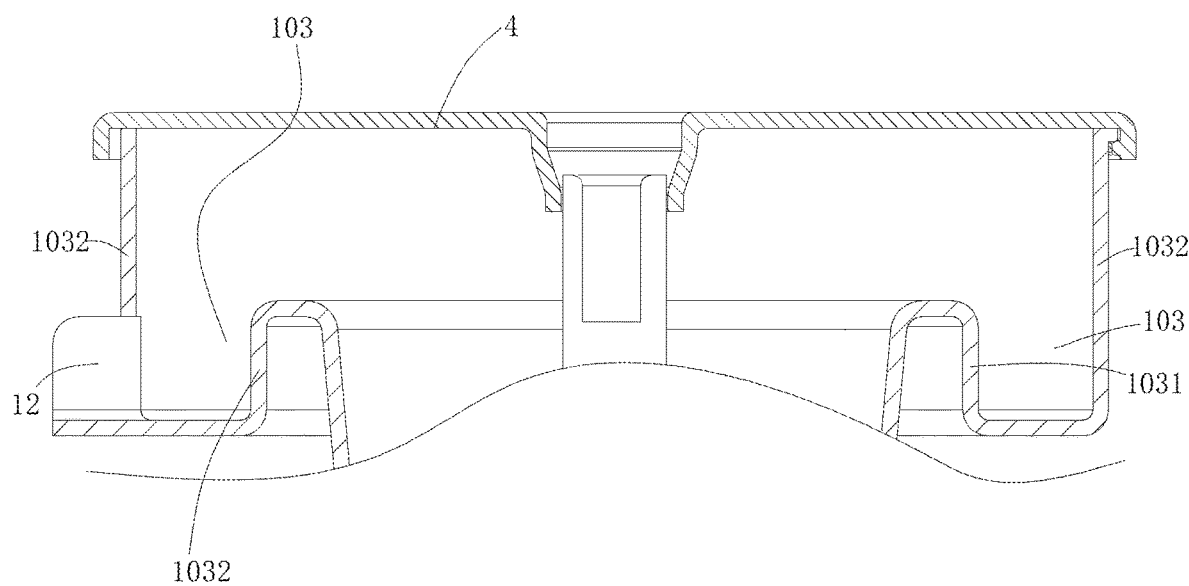
FIG. 4 is a schematic diagram of Embodiment 1 of a water outlet portion.

As shown in FIG. 4, as Embodiment 1 of the water outlet portion 103 of the present invention, an outer side wall 1031 of the temporary water storage tank is higher than an inner side wall 1032 of the temporary water storage tank, and the partition plate 4 is in contact with an upper end of the outer side wall 1031 of the temporary water storage tank.

Figure 5:
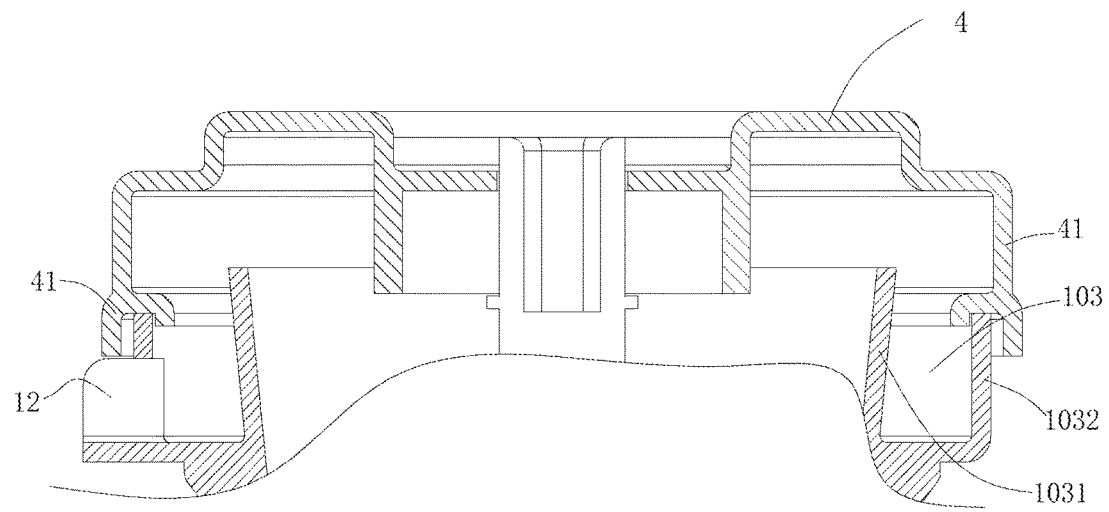
FIG. 5 is a schematic diagram of Embodiment 2 of a water outlet portion.

As shown in FIG. 5, as Embodiment 2 of the water outlet portion 103 of the present invention, an outer side wall 1031 of the temporary water storage tank is lower than an inner side wall 1032 of the temporary water storage tank, the partition plate 4 has an extension 41 extending downward, and the partition plate 4 is in contact with the outer side wall 1031 of the temporary water storage tank by means of the extension 41. Embodiment 2 can further compress a longitudinal space, that is, compared with that in Embodiment 1, the driving assembly 3 can be closer to an upper side of the lifting inner cavity 101, thus optimizing the overall size of the water lifting device.

In addition, as shown in FIG. 2, in order to further improve the drainage effect, a guide surface extending to the temporary water storage tank in a cambered shape or as an inclined plane is further provided at the highest position H of an inner wall of the lifting inner cavity 101. This makes the water climbing along the inner wall of the lifting inner cavity 101 better flow into the water outlet portion 103 when the stirring assembly 2 operates.

When the water lifting device of the present invention is in use, the water inlet portion 102 at the lower end is inserted into a water tank, and water in the water tank enters the water inlet portion 102 from the water inlet 11 and rises to the lifting inner cavity 101, so as to facilitate stirring by the stirring assembly 2, and in order to cope with a low water level and improve efficiency. As shown in FIGS. 2 and 3, a drainage assembly 5 is further arranged at a lower end of the rotating shaft 21, the drainage assembly 5 is provided with a drainage blade located in the water inlet portion 102, and the drainage assembly 5 rotates with the rotating shaft 21 to promote entry of an outer liquid into the water inlet portion 102 from the water inlet 11. The drainage assembly 5 is of a propeller-like structure, which rotates with the rotating shaft 21 to stir the water in the water inlet portion 102, so that the water in the water inlet portion 102 can quickly form a vortex, and at the same time, the water in the water tank can be driven to enter the water inlet portion 102 more quickly.

Specifically, as Embodiment 1 of the water inlet 11 of the present invention, a plurality of water inlets 11 are provided, and the plurality of water inlets 11 are evenly distributed in a circumferential direction of the water inlet portion 102. In Embodiment 1, orientations of the plurality of water inlets 11 are opposite to a center of the water inlet portion 102.

Figure 6:
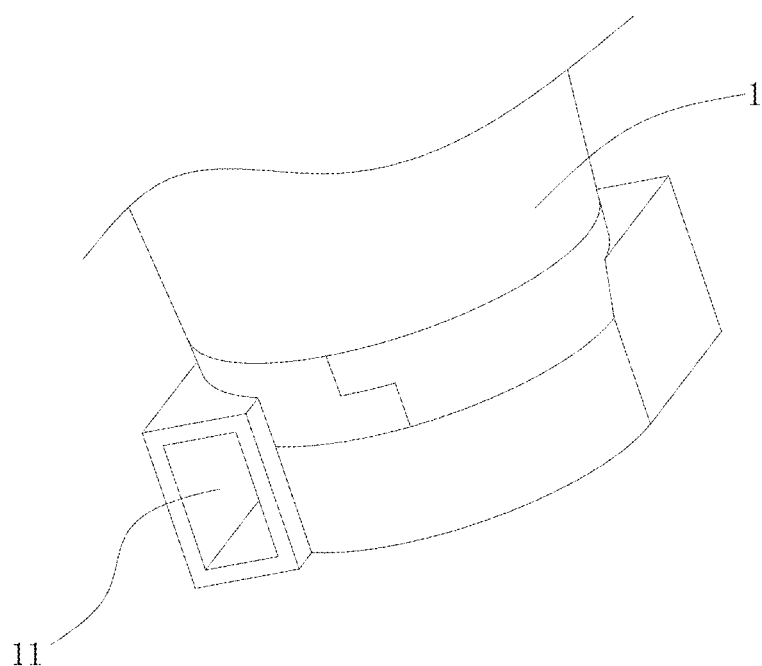
FIG. 6 is a schematic diagram of Embodiment 2 of a water inlet.
Figure 7:
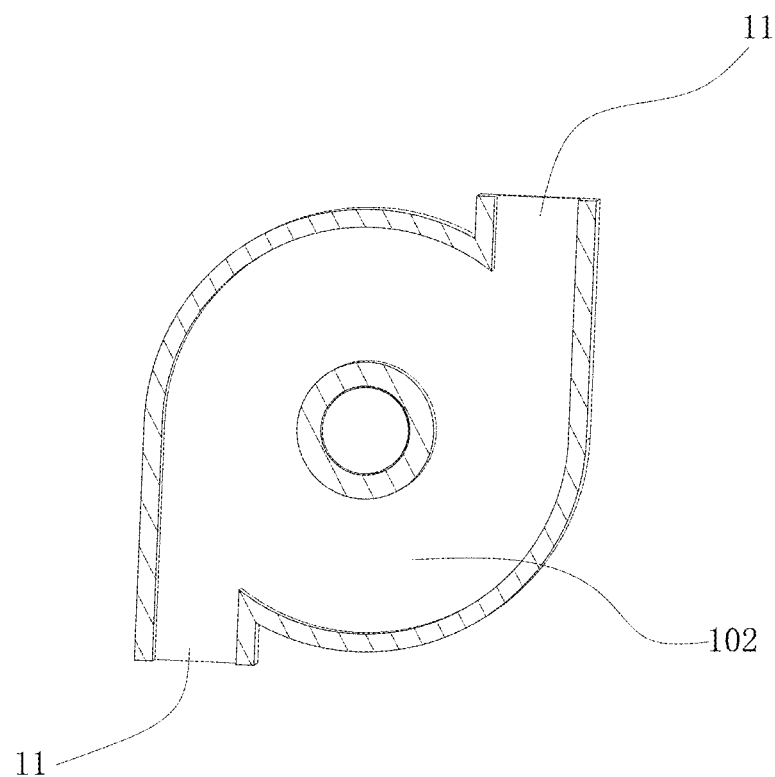
FIG. 7 is an internal schematic diagram of FIG. 6.

As shown in FIGS. 6 and 7, as Embodiment 2 of the water inlet 11 of the present invention, at least two water inlets 11 are provided, and water inlet directions of the two water inlets 11 are a tangential direction of the water inlet portion 102. In Embodiment 2, the water entering from the two water inlets 11 flows in the tangential direction, which can form a vortex more quickly.

Figure 8:
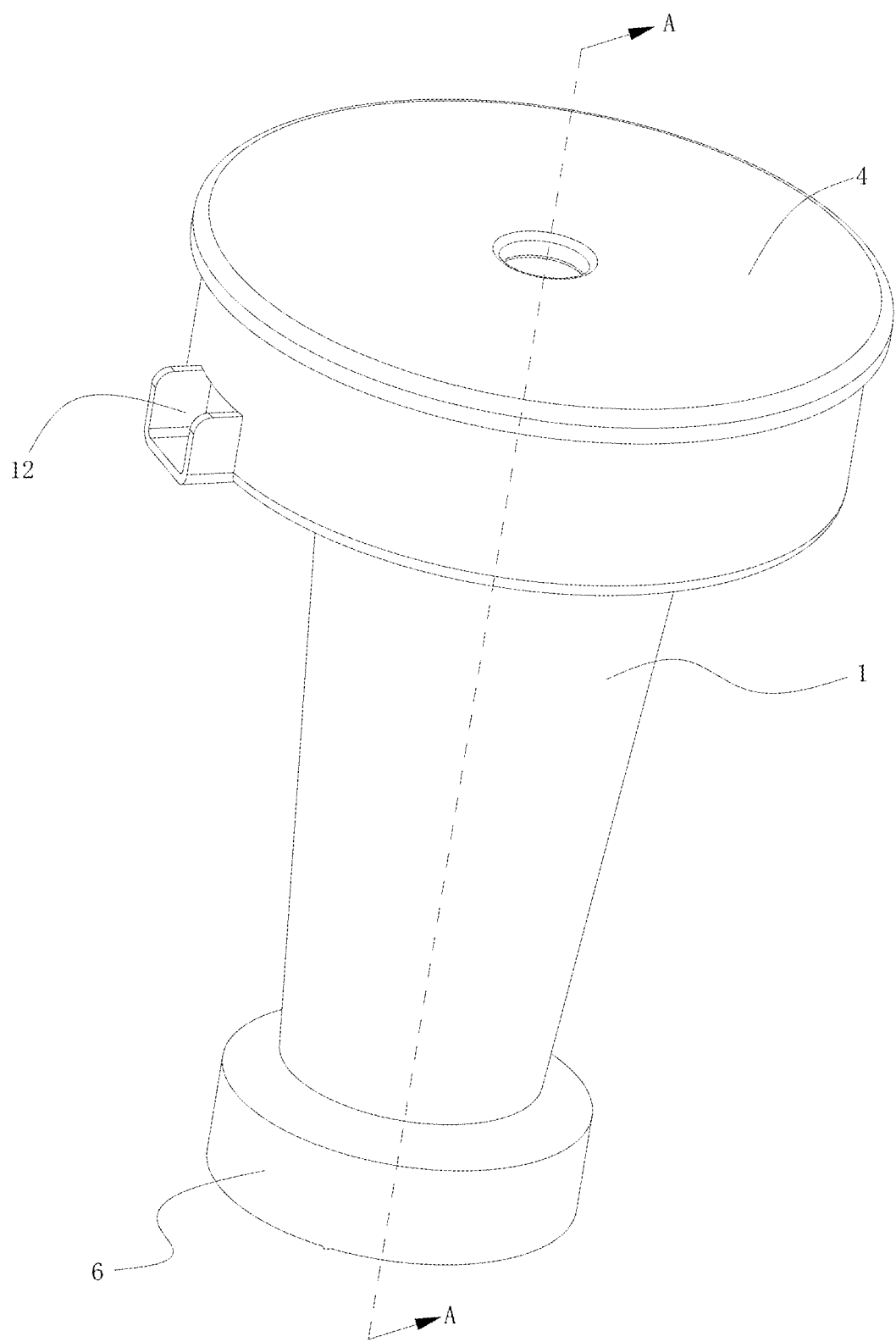
FIG. 8 is a schematic diagram of a water lifting device with a filter assembly.

In addition, as shown in FIG. 8, in order to further improve the water quality, in the present invention, a filter assembly 6 is further mounted on an outer side of the water inlet portion 102, and the filter assembly 6 covers the water inlet 11. The filter assembly 6 may be made of a material with a specific filtering function, such as filter cotton, and is detachably mounted on the outer side of the water inlet portion 102, so that when the water lifting device is used, the water in the water tank can be filtered first and then lifted into a drinking cavity for pets to drink.

Figure 9:
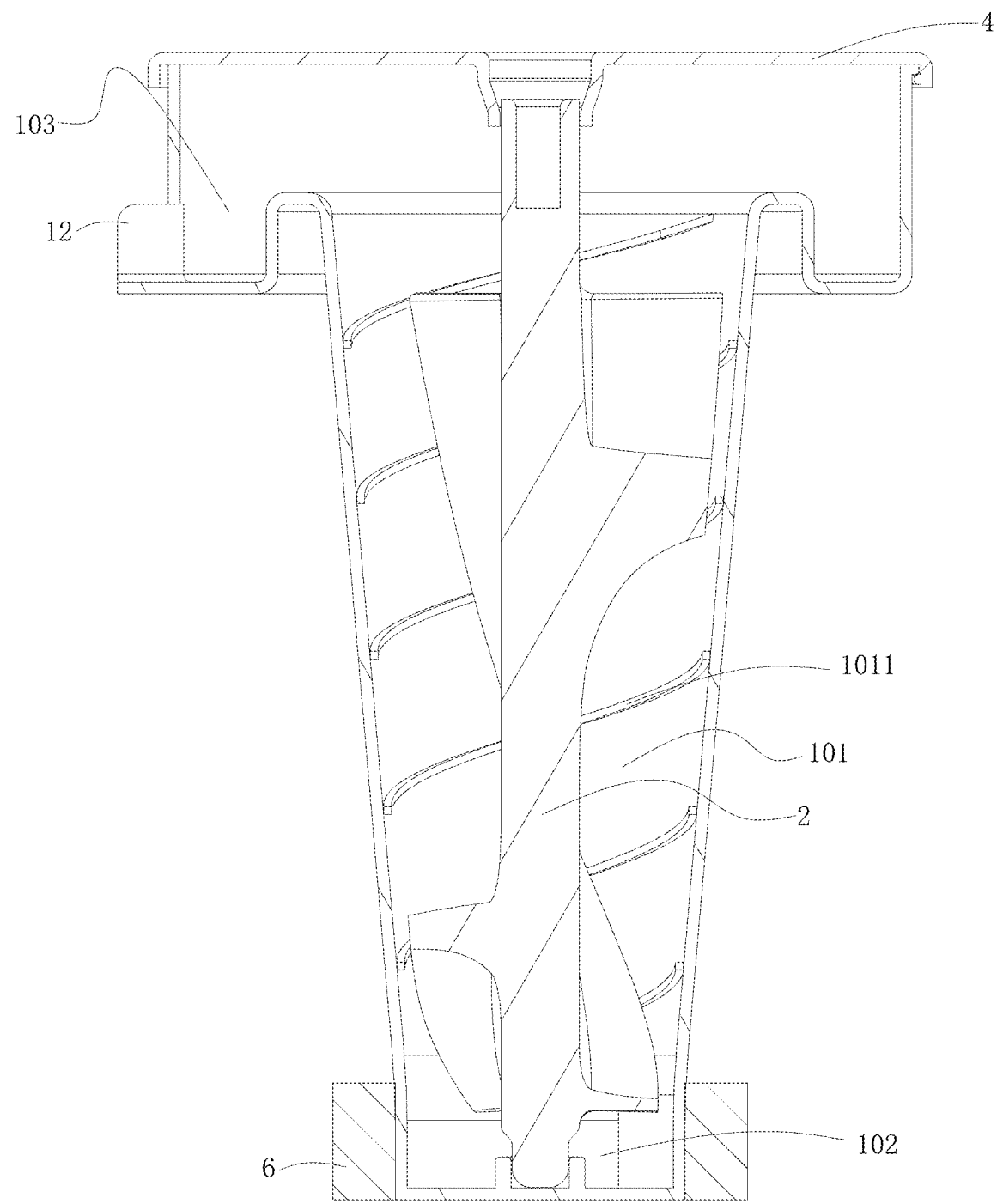
FIG. 9 is a sectional view taken along line A-A of FIG. 8.
Figure 10:
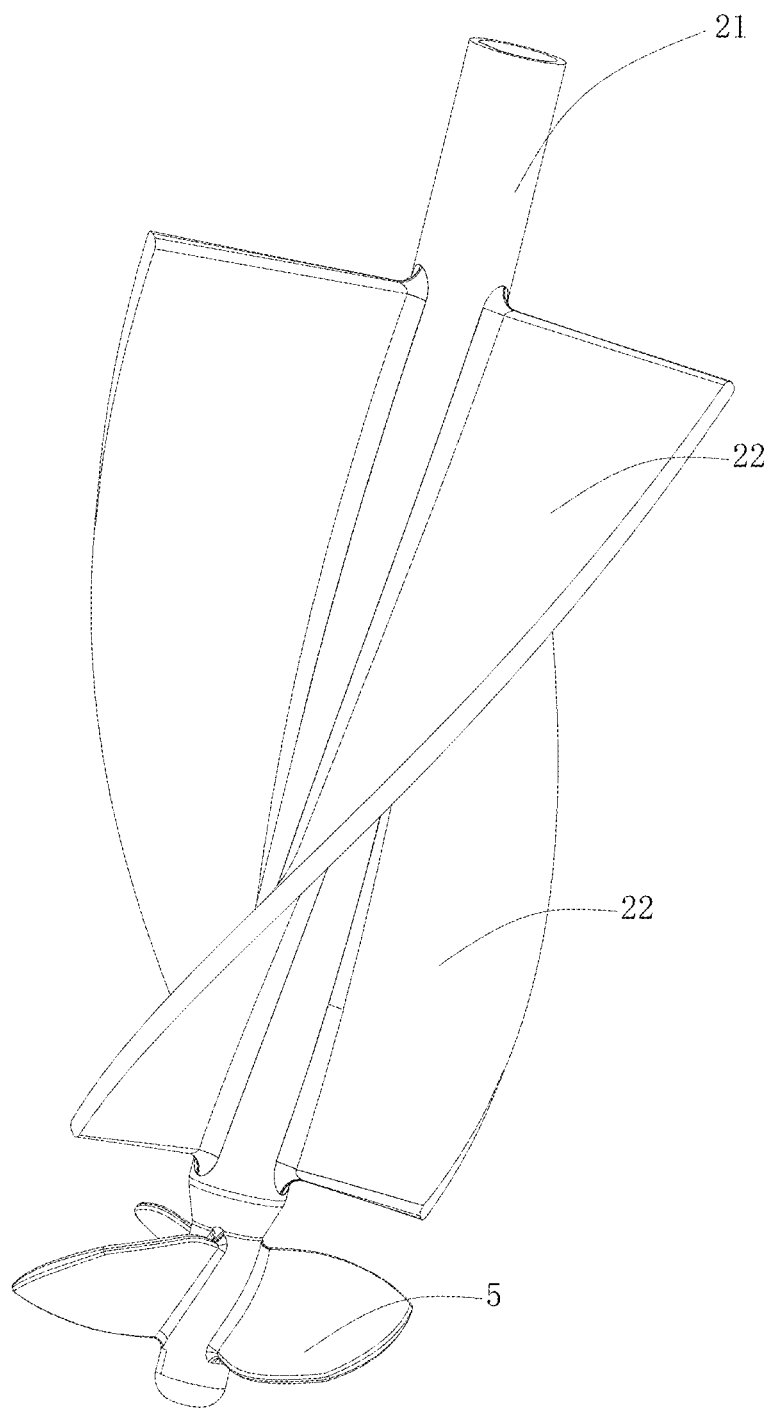
FIG. 10 is a schematic diagram of a stirring assembly with a drainage assembly.
Figure 11:
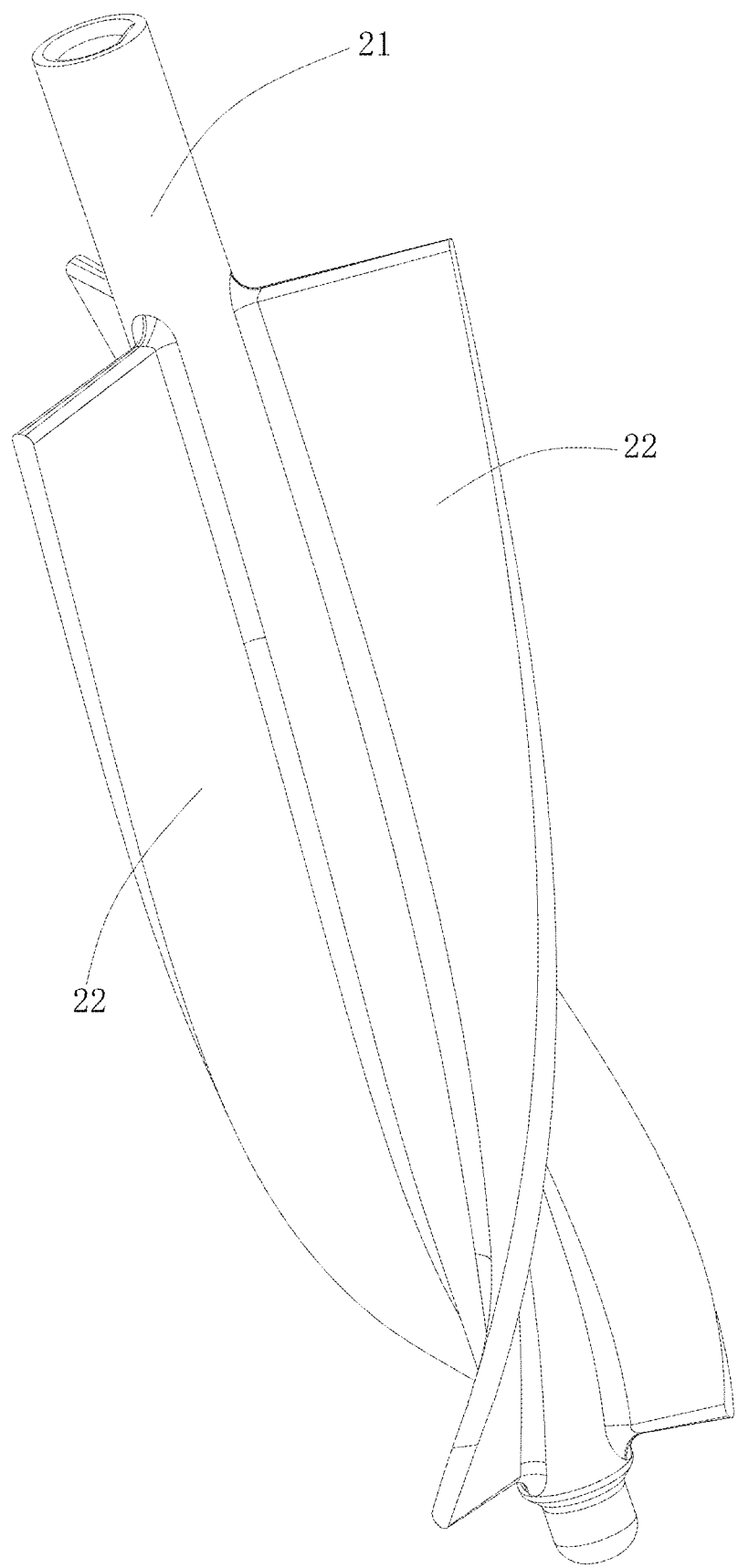
FIG. 11 is a schematic diagram of Embodiment 2 of stirring blades.
Figure 12:
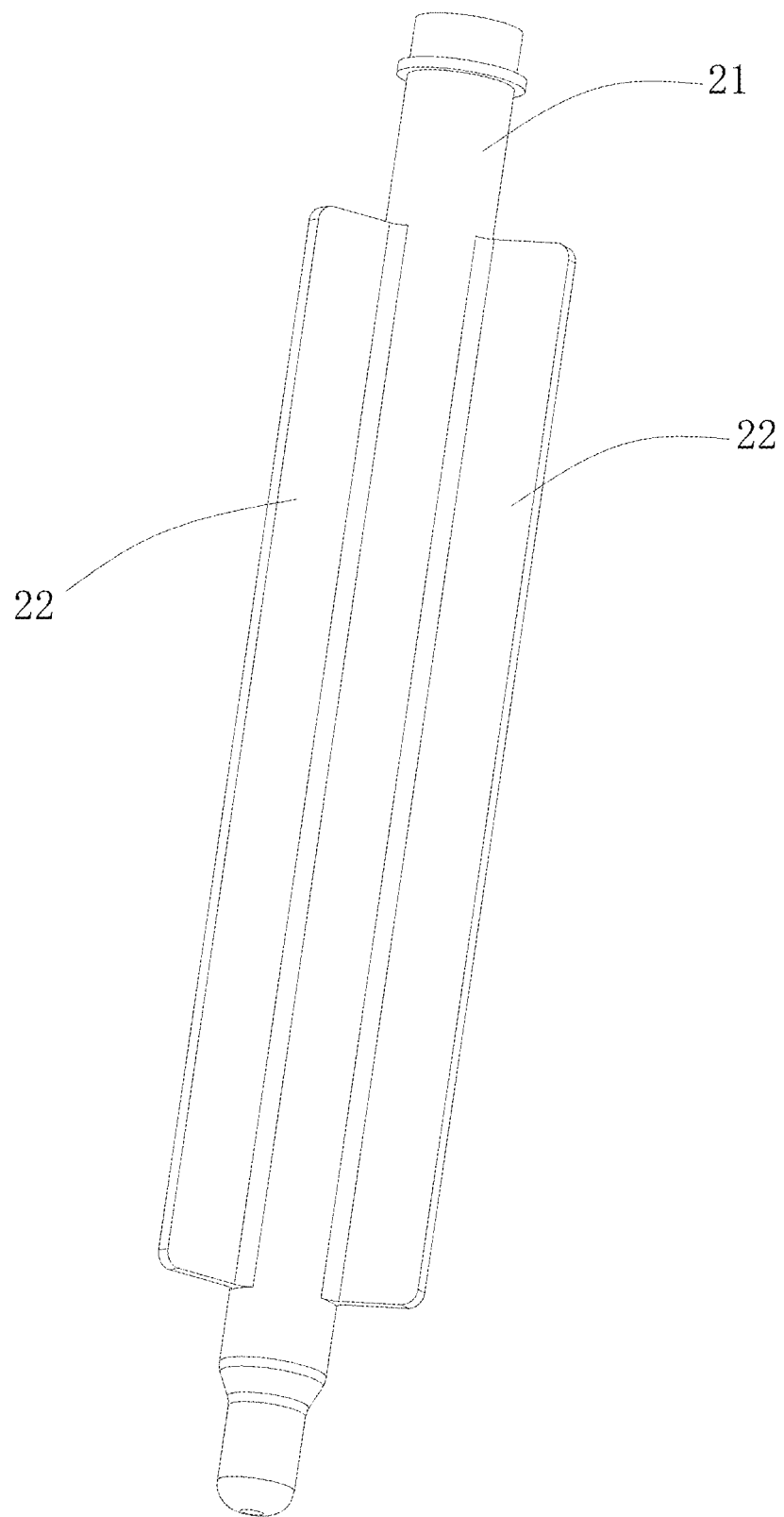
FIG. 12 is a schematic diagram of Embodiment 3 of stirring blades.
Figure 13:
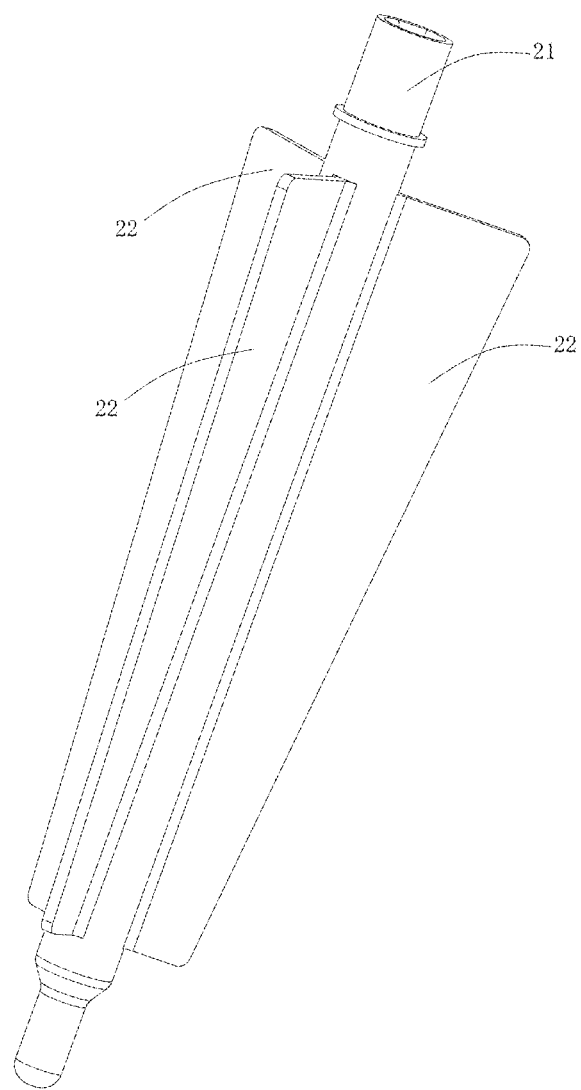
FIG. 13 is a schematic diagram of Embodiment 4 of stirring blades.

In the present invention, as shown in FIG. 9, in order to improve the effect of vortex formation and lifting of water flow by the water lifting device, the inner wall of the lifting inner cavity 101 is in the shape of an annular cylinder with a width gradually decreasing from the water outlet portion 103 to the water inlet portion 102, or the inner wall of the lifting inner cavity 101 is in the shape of an annular cylinder with an equal width from the water outlet portion 103 to the water inlet portion 102. An annular cylindrical inner wall with the same diameter or an annular cylindrical inner wall with a wide top and a narrow bottom is adopted, which can cooperate with the stirring assembly 2 for stirring, to better generate a vortex. Moreover, an annular portion 1011 arranged in a thread line shape may be further provided on the inner wall of the lifting inner cavity 101, so as to further cooperate with the stirring assembly 2 for stirring to generate a vorticity. In this embodiment, the annular portion 1011 may be of an annular protrusion structure or an annular groove structure, and a threaded encircling mode thereof cooperates with the water flow stirred into a vortex, thereby further assisting the water flow in climbing along the inner wall. In this solution, a threaded encircling rotation direction of the annular portion 1011 is adapted to a stirring direction of the stirring assembly 2, and especially stirring blades 22 of the stirring assembly 2 are of a spiral blade structure (as shown in FIGS. 10 and 11), so that when stirred by the stirring assembly 2, the water flow can climb along the annular portion 1011 to realize water lifting. When the stirring blades 22 of the stirring assembly 2 are of a straight sheet structure (as shown in FIGS. 12 and 13), the rotation direction of the annular portion 1011 is not limited.

As an element for providing a vorticity to the water flow in the present invention, the stirring assembly 2 includes a rotating shaft 21 connected to the driving assembly 3 and stirring blades 22 arranged on a periphery of the rotating shaft 21, and the stirring blades 22 rotate with the rotating shaft 21 and stir the liquid in the lifting inner cavity 101, so that the liquid forms a vortex and enters the water outlet portion 103 along an inner wall of the lifting inner cavity 101. Herein, a variety of ways and structures to form a stirred vortex are proposed.

In Embodiment 1 of stirring blades 22 of the present invention, the stirring blades 22 are spirally arranged in an axial direction of the rotating shaft 21 and around the periphery of the rotating shaft 21. The stirring blades 22, which are in the form of spiral sheets, may have a tendency to guide the water to flow upward along themselves during the rotating and stirring. This embodiment is not shown in the drawing.

As shown in FIGS. 10 and 11, in Embodiment 2 of stirring blades 22 of the present invention, a plurality of stirring blades 22 are provided, and the plurality of stirring blades 22 are arranged in a twisted shape in an axial direction of the rotating shaft 21. During the rotating and stirring, the blades can provide a greater vorticity to the water flow. FIG. 10 shows a structure in which a drainage assembly 5 is added to a lower side of the rotating shaft 21.

As shown in FIG. 12, in Embodiment 3 of stirring blades 22 of the present invention, a plurality of stirring blades 22 are provided, each stirring blade 22 is in the shape of a straight sheet, and the plurality of stirring blades 22 are evenly distributed on the periphery of the rotating shaft 21. The stirring blades, as an alternative structure of stirring blade 22 in the present invention, can also provide a vorticity to water flow during the rotation.

As shown in FIG. 13, in Embodiment 4 of stirring blades 22 of the present invention, a plurality of stirring blades 22 are provided, each stirring blade 22 is in the shape of a sheet with a wide top and a narrow bottom, and the plurality of stirring blades 22 are evenly distributed on the periphery of the rotating shaft 21. The stirring blades, as an alternative structure of stirring blade 22 in the present invention, can also provide a vorticity to water flow during the rotation.

Figure 14:
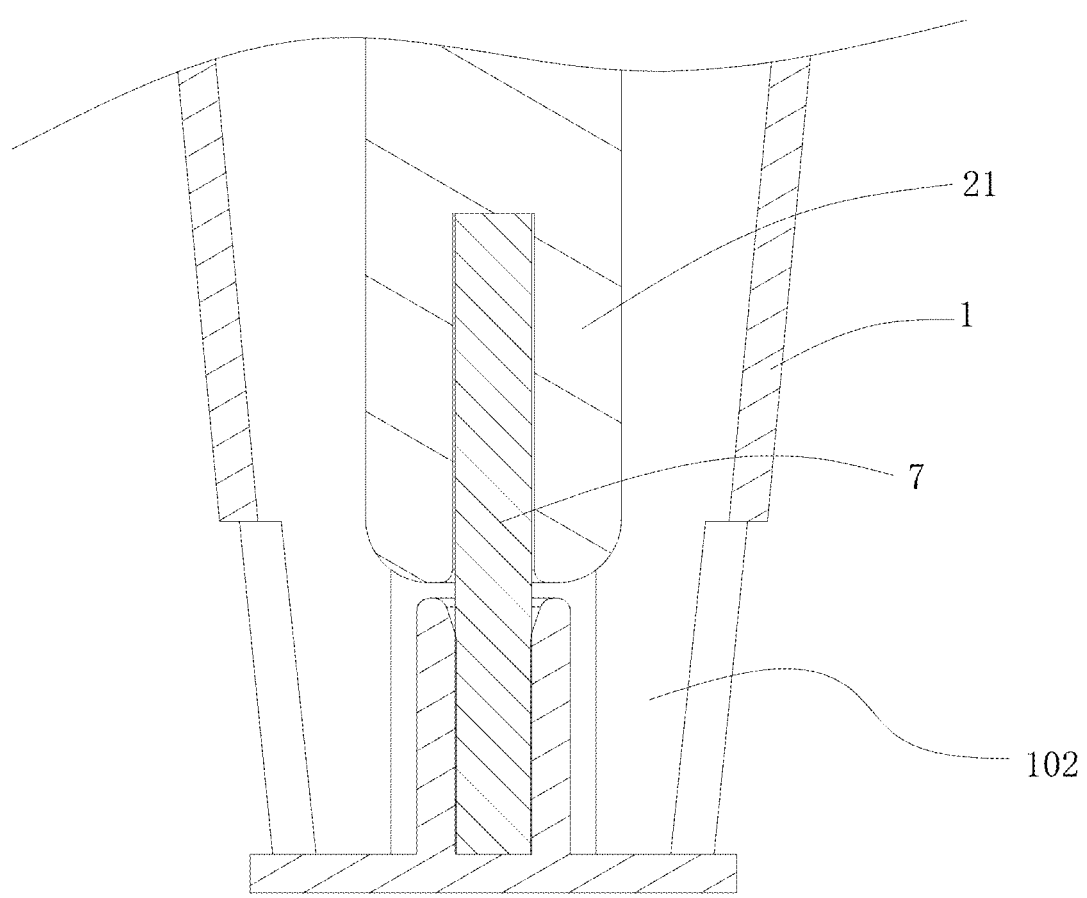
FIG. 14 is a schematic diagram showing mounting Embodiment 1 of a rotating shaft.

In the embodiment of the present invention, the lower end of the rotating shaft 21 is rotatably connected in the water inlet portion 102, and may be of a convex shaft type with a simple structure, and correspondingly, a groove for the rotating shaft to be inserted is provided in the water inlet portion 102, so as to facilitate the rotation of the rotating shaft 21 and prevent displacement of the rotating shaft. In addition, as shown in FIG. 14, the lower end of the rotating shaft 21 may alternatively be mounted at the water inlet portion 102 by additionally arranging a rotating connecting member 7. In this embodiment, the lower end of the rotating shaft 21 has a mounting port recessed upward. The rotating connecting member 7 is a supporting shaft, with one end inserted into the mounting port of the rotating shaft 21 and the other end inserted into the groove of the water inlet portion 102, so as to realize the rotatable connection of the rotating shaft 21.

Figure 15:
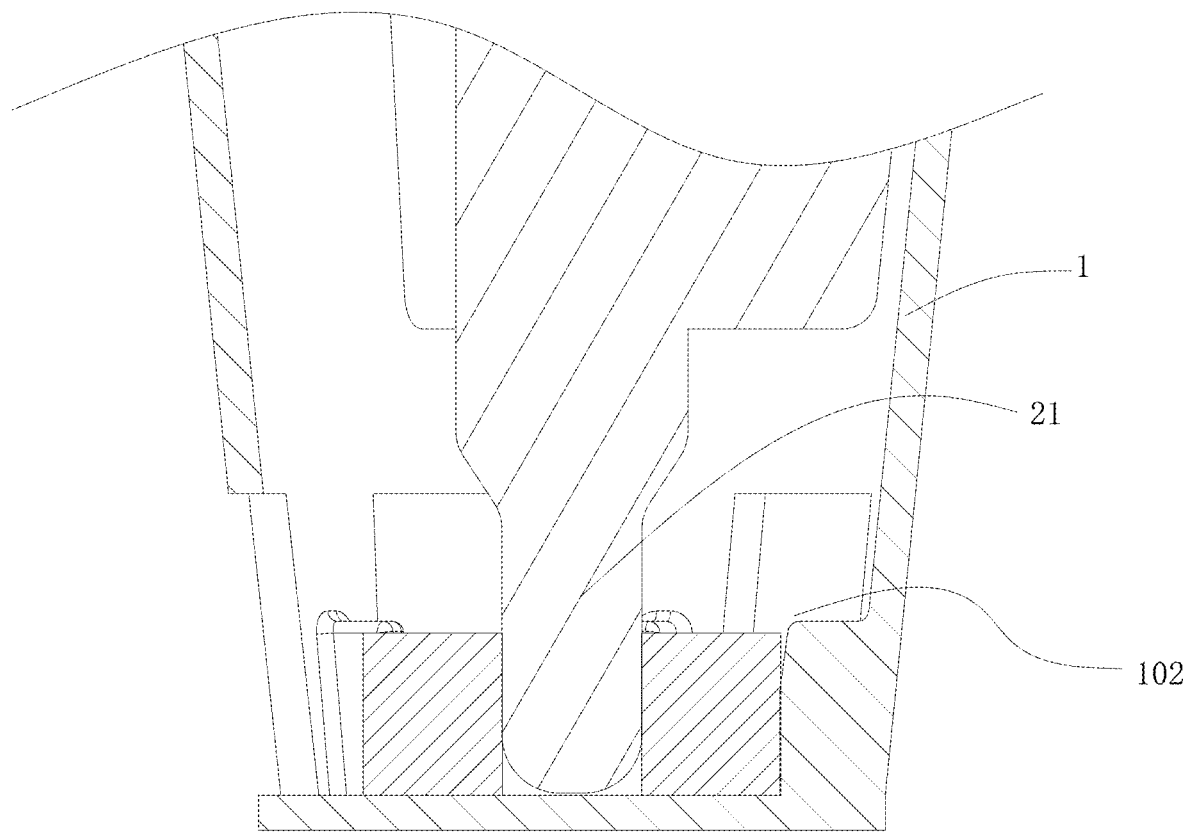
FIG. 15 is a schematic diagram showing mounting of Embodiment 2 of a rotating shaft.

Of course, as shown in FIG. 15, in order to improve the stability of rotation and reduce resistance, a bearing may be mounted in the water inlet portion 102, and the lower end of the rotating shaft 21 is directly mounted on the bearing.

Figure 16:
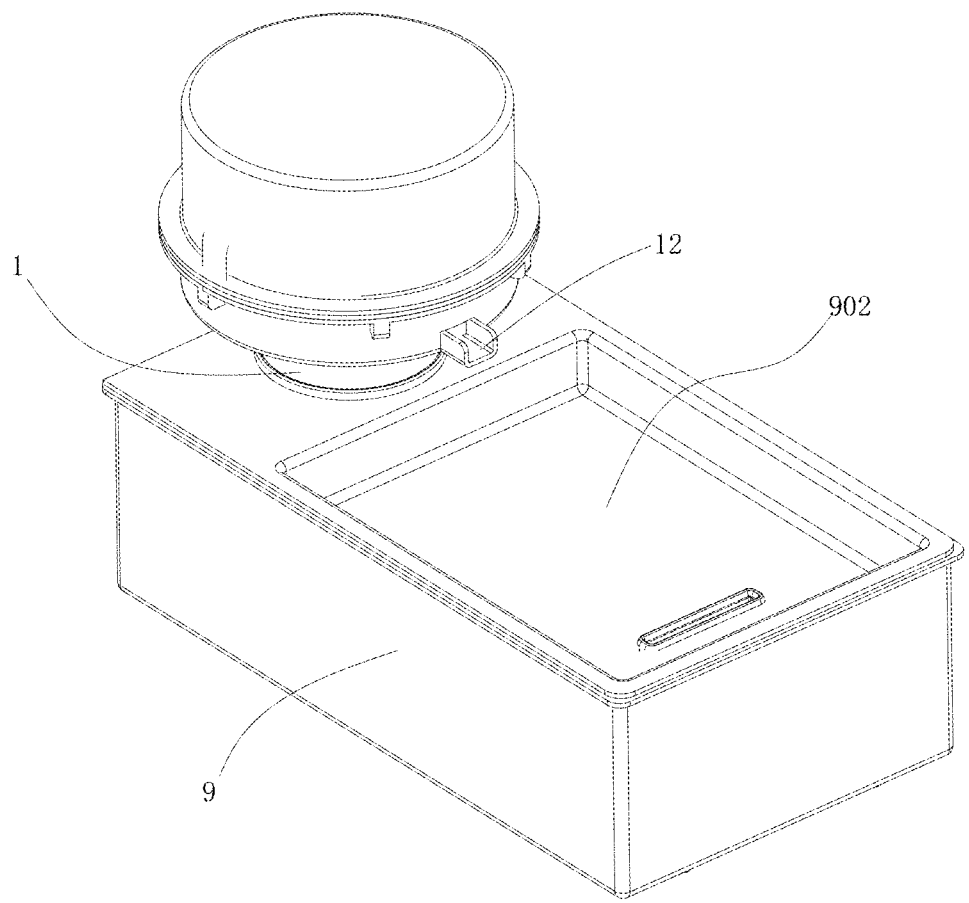
FIG. 16 is a schematic diagram of a pet water dispenser.
Figure 17:
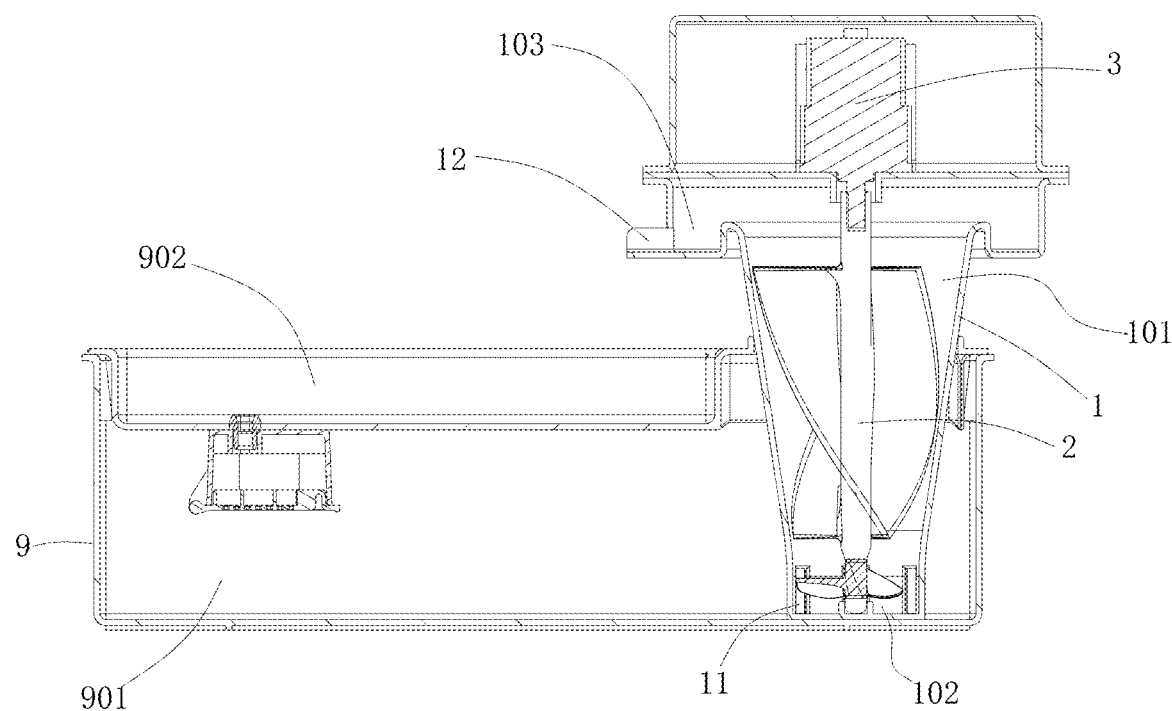
FIG. 17 is a half sectional view of FIG. 16.

Based on this, as shown in FIGS. 16 and 17, the present invention further provides a pet water dispenser, including a water dispenser box 9, where a water storage cavity 901 is provided in the water dispenser box 9, a drinking cavity 902 is provided on the water dispenser box 9, the above water lifting device for a pet water dispenser is further connected to the water dispenser box 9, the water lifting device for a pet water dispenser is detachably mounted on the water dispenser box 9, a water inlet portion 102 and a water inlet 11 are located in the water storage cavity 901, and a water outlet 12 is located on an upper side of the drinking cavity 902. The water lifting device according to the present invention is directly mounted on the water dispenser box 9, and the water inlet 11 thereof is inserted into the water storage cavity 901. The driving assembly 3 drives the stirring assembly 2 to rotate, so that the water in the water inlet portion 102 climbs along the lifting inner cavity 101, enters the water outlet portion 103, and then flows out from the water outlet 12 to naturally fall into the drinking cavity 902 for pets to drink. Moreover, in this solution, when not used for a long time or needs to be cleaned, the entire water lifting device can be removed from the water dispenser box 9, or the driving assembly 3 and the stirring assembly 2 may be removed from the housing 1 separately to facilitate cleaning.

It should be understood that although the terms "first", "second", etc. are used in the present invention to describe various information, the information should not be limited to these terms. These terms are only used to distinguish the same type of information from each other. For example, without departing from the scope of the present invention, "first" information may be also referred to as "second" information, and similarly, "second" information may be also referred to "first" information. In addition, an orientation or positional relationship indicated by the term "central", "upper", "lower", "left", "right", "vertical", "horizontal", "inner", "outer" or the like is based on the orientation or positional relationship shown in the accompanying drawings, which is only for convenience of describing the present invention and simplifying the description, rather than indicating or implying that the referred device or element must have a particular orientation, be constructed and operated in a particular orientation, and therefore should not be construed as limiting the present invention.

The above descriptions are merely preferred implementations of the present invention. It should be noted that those of ordinary skill in the art may further make several improvements and variations without departing from the principle of the present invention, and such improvements and variations should be also deemed as falling within the protection scope of the present invention.

What is claimed is:

1. A water lifting device for a pet water dispenser, comprising:
   a housing,
   a stirring assembly mounted on the housing,
   and a driving assembly connected to the stirring assembly,
   wherein the housing is provided with a lifting inner cavity with a lower side being a water inlet portion and an upper side being a water outlet portion, the housing is further provided with a water inlet in communication with the water inlet portion and a water outlet in communication with the water outlet portion, the stirring assembly is arranged in the lifting inner cavity and is configured to guide a liquid in the water inlet portion to flow to the water outlet portion, and the driving assembly is configured to drive the stirring assembly to rotate in the lifting inner cavity;
   wherein an annular portion arranged in a thread line shape is further provided on an inner wall of the lifting inner cavity.

2. The water lifting device for a pet water dispenser according to claim 1, wherein the stirring assembly comprises:
   a rotating shaft connected to the driving assembly, and
   stirring blades arranged on a periphery of the rotating shaft,
   wherein the stirring blades rotate with the rotating shaft and stir the liquid in the lifting inner cavity, so that the liquid forms a vortex and enters the water outlet portion along an inner wall of the lifting inner cavity.

3. The water lifting device for a pet water dispenser according to claim 2, wherein the stirring blades are spirally arranged in an axial direction of the rotating shaft and around the periphery of the rotating shaft.

4. The water lifting device for a pet water dispenser according to claim 2, wherein a plurality of stirring blades are provided, and the plurality of stirring blades are arranged in a twisted shape in an axial direction of the rotating shaft.

5. The water lifting device for a pet water dispenser according to claim 2, wherein a plurality of stirring blades are provided, each stirring blade is in the shape of a straight sheet, and the plurality of stirring blades are evenly distributed on the periphery of the rotating shaft.

6. The water lifting device for a pet water dispenser according to claim 2, wherein a plurality of stirring blades are provided, each stirring blade is in the shape of a sheet with a wide top and a narrow bottom, and the plurality of stirring blades are evenly distributed on the periphery of the rotating shaft.

7. The water lifting device for a pet water dispenser according to claim 2, wherein a lower end of the rotating shaft is mounted in the water inlet portion by means of a bearing or a rotating connecting member.

8. The water lifting device for a pet water dispenser according to claim 1, wherein the water outlet portion is a temporary water storage tank located on a peripheral side of the lifting inner cavity, and a tank bottom of the temporary water storage tank is lower than the highest position of an inner wall of the lifting inner cavity.

9. The water lifting device for a pet water dispenser according to claim 8, wherein a partition plate for sealing an upper end of the lifting inner cavity is arranged on an upper side of the water outlet portion, and the driving assembly is mounted on an outer side of the lifting inner cavity and is in transmission butt joint with the stirring assembly.

10. The water lifting device for a pet water dispenser according to claim 9, wherein an outer side wall of the temporary water storage tank is higher than an inner side wall of the temporary water storage tank, and the partition plate is in contact with an upper end of the outer side wall of the temporary water storage tank.

11. The water lifting device for a pet water dispenser according to claim 9, wherein an outer side wall of the temporary water storage tank is lower than an inner side wall of the temporary water storage tank, the partition plate has an extension extending downward, and the partition plate is in contact with the outer side wall of the temporary water storage tank by means of the extension.

12. The water lifting device for a pet water dispenser according to claim 8, wherein the inner wall of the lifting inner cavity is in the shape of an annular cylinder with a width gradually decreasing from the water outlet portion to the water inlet portion.

13. The water lifting device for a pet water dispenser according to claim 8, wherein the inner wall of the lifting inner cavity is in the shape of an annular cylinder with an equal width from the water outlet portion to the water inlet portion.

14. The water lifting device for a pet water dispenser according to claim 1, wherein a guide surface extending to the temporary water storage tank in a cambered shape or as an inclined plane is further provided at the highest position of an inner wall of the lifting inner cavity.

15. The water lifting device for a pet water dispenser according to claim 1, wherein a plurality of water inlets are provided, and the plurality of water inlets are evenly distributed in a circumferential direction of the water inlet portion.

16. The water lifting device for a pet water dispenser according to claim 1, wherein a filter assembly is further mounted on an outer side of the water inlet portion, and the filter assembly covers the water inlet.

17. A pet water dispenser, comprising a water dispenser box, wherein a water storage cavity is provided in the water dispenser box, a drinking cavity is provided on the water dispenser box,
   the water lifting device for a pet water dispenser according to claim 1 is further connected to the water dispenser box, the water lifting device is detachably mounted on the water dispenser box,
   a water inlet portion and a water inlet are located in the water storage cavity, and a water outlet is located on an upper side of the drinking cavity.

18. A water lifting device for a pet water dispenser, comprising:
a housing,
a stirring assembly mounted on the housing,
and a driving assembly connected to the stirring assembly,
wherein the housing is provided with a lifting inner cavity with a lower side being a water inlet portion and an upper side being a water outlet portion, the housing is further provided with a water inlet in communication with the water inlet portion and a water outlet in communication with the water outlet portion, the stirring assembly is arranged in the lifting inner cavity and is configured to guide a liquid in the water inlet portion to flow to the water outlet portion, and the driving assembly is configured to drive the stirring assembly to rotate in the lifting inner cavity;
wherein the stirring assembly comprises:
a rotating shaft connected to the driving assembly, and
stirring blades arranged on a periphery of the rotating shaft,
wherein the stirring blades rotate with the rotating shaft and stir the liquid in the lifting inner cavity, so that the liquid forms a vortex and enters the water outlet portion along an inner wall of the lifting inner cavity;
wherein a drainage assembly is further arranged at a lower end of the rotating shaft, the drainage assembly is provided with a drainage blade located in the water inlet portion, and the drainage assembly rotates with the rotating shaft to promote entry of an outer liquid into the water inlet portion from the water inlet.

* * * * *